United States Patent Office 3,055,954
Patented Sept. 25, 1962

3,055,954
PROCESS FOR THE PREPARATION OF
1-CHLORO-2-BUTENE
Amelio E. Montagna, South Charleston, and Lawrence
G. Hess, Charleston, W. Va., assignors to Union Carbide Corporation, a corporation of New York
No Drawing. Filed Apr. 28, 1961, Ser. No. 106,159
18 Claims. (Cl. 260—654)

This invention relates to an improved process for the preparation of 1-chloro-2-butene, commonly called crotyl chloride, by reacting hydrogen chloride with 1,3-butadiene in a reaction medium containing controlled amounts of 3-chloro-1-butene.

In the past, the preparation of 1-chloro-2-butene by the reaction of hydrogen chloride with 1,3-butadiene has been accompanied by the formation of relatively large amounts of 3-chloro-1-butene which is the least desirable of the two isomers on the basis of known uses for the chlorobutenes, for example as grain fumigants.

In an attempt to increase the yield of 1-chloro-2-butene and to suppress or to eliminate the formation of 3-chloro-1-butene, on reacting hydrogen chloride with 1,3-butadiene, it has been proposed to conduct such reaction in a reaction medium containing various catalysts. Illustrative of such catalysts are the salts of polyvalent metals, as for example are disclosed in U.S. Patent 2,123,504 to Harry B. Dykstra issued July 12, 1938. Of the various catalysts which have been proposed, however, none has been particularly successful as the yield of 1-chloro-2-butene as compared to the formation of 3-chloro-1-butene has at best been in the ratio of about 6:1 in terms of parts by weight. Furthermore, such yields of 1-chloro-2-butene have only been effected after reaction times of 30 to 40 hours.

The present invention provides for the preparation of 1-chloro-2-butene in excellent yields and in relatively short periods of time without the substantial formation of 3-chloro-1-butene by admixing hydrogen chloride with 1,3-butadiene in a reaction medium containing controlled amounts of 3-chloro-1-butene such that the mole ratio of 3-chloro-1-butene to 1,3-butadiene, prior to the start of the reaction, is from about 1:0.1 to about 1:5, generally from about 1:2 to about 1:4, and preferably from about 1:3 to about 1:4.

The reaction of hydrogen chloride with 1,3-butadiene in a reaction medium containing controlled amounts of 3-chloro-1-butene can be represented by the following equation:

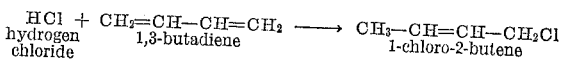

Various amounts of hydrogen chloride and 1,3-butadiene can be admixed in contact with 3-chloro-1-butene to produce 1-chloro-2-butene in accordance with the present invention. Generally, admixing from about 0.5 mole to about 2 moles of hydrogen chloride per mole of 1,3-butadiene is satisfactory. Reacting a mixture containing more than about 2 moles of hydrogen chloride per mol of 1,3-butadiene does not materially increase the yield of 1-chloro-2-butene and is economically undesirable. For purposes of this invention it is preferred to use about equimolar amounts of hydrogen chloride and 1,3-butadiene.

The temperature at which the reaction between hydrogen chloride and 1,3-butadiene is conducted can vary over a wide range from as low as about 20° C. to as high as about 100° C. Generally, the reaction proceeds satisfactorily in the range of from about 45° C. to about 75° C. A temperature in the range of about 55° C. to about 65° C. is most preferred.

The process of the present invention can be conducted under atmospheric, superatmospheric or subatmospheric pressures. Generally, the pressure at which the process is conducted will be in the range of about 60 to about 70 pounds per square inch gauge, depending, as a rule, upon the particular equipment in which the reaction is conducted.

It is also preferred to conduct the reaction between hydrogen chloride and 1,3-butadiene in the presence of an organic diluent which is a solvent for the starting materials, as the use of an organic diluent facilitates removal of the 1-chloro-2-butene from the reacted mixture. It is customary to use the organic diluent in amounts of from about 2 moles to about 10 moles per mole of the 1,3-butadiene present in the reaction mixture. The upper limit with respect to the amount of organic diluent used will depend upon the rate at which it is desired to conduct the reaction. The more dilute the reaction mixture, the slower is the rate of the reaction.

Suitable organic diluents, include among others, the cycloaliphatic hydrocarbons such as cyclohexane, n-propylcyclohexane and the like; aliphatic hydrocarbons such as n-hexane, n-heptane, n-octane and the like; ethers such as diethyl ether, diethyl ether of ethylene glycol, diethyl ether of 1,3-propylene glycol, dioxane and the like; aliphatic ketones such as acetone, methyl ethyl ketone and the like; aliphatic alcohols such as methyl alcohol, ethyl alcohol and the like; lower fatty acids having the formula RCOOH wherein R is an alkyl group having a maximum of 3 carbon atoms such as acetic acid, n-propionic acid, and n-butanoic acid and the like. Particularly preferred for purposes of this invention is acetic acid either as a water solution, or in its anhydrous form, i.e., glacial acetic acid. In those instances in which an organic diluent is used and the organic diluent is acetic acid, the amount of acetic acid employed is from about 2 moles to about 10 moles per mole of 1,3-butadiene, preferably about 5 moles of acetic acid per mole of 1,3-butadiene. Mole ratios are based on the anhydrous form of acetic acid.

In accordance with the present invention, the reaction between hydrogen chloride and 1,3-butadiene to produce 1-chloro-2-butene can be effected without the use of a catalyst. If desired, however, a catalyst can be employed for the purpose of promoting the reaction. Examples of such catalysts are the following: salts of any metal below calcium in the electromotive series, for instance the chlorides, bromides, iodides, nitrates, sulfates, and acetates of such metals as magnesium, aluminum, zinc, iron (both ferric and ferrous), cadmium, cobalt, nickel, tin, lead, copper (both cupric and cuprous), mercury and the like. Among specific salts can be noted ferric chloride, magnesium chloride, aluminum chloride, cuprous chloride, cobalt chloride, cadmium acetate and the like. Other suitable catalysts include the strongly acidic agents such as sulfuric acid, phosphoric acid, p-toluenesulfonic acid, benzenesulfonic acid, and the like. Also mixtures of these catalysts can be used.

A preferred catalyst for purposes of promoting the reaction between hydrogen chloride and 1,3-butadiene is cuprous chloride. A particularly desirable reaction medium for conducting the reaction is one wherein the catalyst used is cuprous chloride and the organic diluent is acetic acid. In those instances cuprous chloride is used in an amount of about 0.2 percent by weight to about 3 percent by weight, preferably from about 0.5 percent by weight to about 1 percent by weight based on the weight of acetic acid.

Generally, completion of the reaction is effected after about 5 to 7 hours. The time required in order to complete the reaction will depend in part upon the reaction temperature and also on the type of reaction equipment used.

The liquid 1-chloro-2-butene can be recovered from the reacted mixture by a number of convenient methods. For example the crude reaction product can be diluted with water, with the result that two phases are formed: an aqueous phase containing a catalyst, if one had been used, unreacted hydrogen chloride and any water-soluble solvent; and an organic phase which comprises the crude reaction product. The organic phase can be distilled to recover 1-chloro-2-butene as a distillate boiling at 83° C.–85° C. at atmospheric pressure.

If desired the organic phase can be washed prior to being subjected to the distillation operation with an aqueous solution of an alkaline material such as sodium, patassium or lithium carbonate or bicarbonate, sodium potassium or lithium acetate, disodium hydrogen phosphate and the like, in order to neutralize any hydrogen chloride which might be present. The salt formed as a result of the neutralization reaction and any residual alkaline material, being water soluble, can be easily removed by water washing.

The process of this invention can be conducted either batchwise or continuously. In those instances wherein the process is conducted on a continuous basis the 3-chloro-1-butene which is recovered from the reacted mixture as a distillate, boiling at 63° C.–65° C. can be recycled for further use.

1-chloro-2-butene is a known compound having wide utility as a grain fumigant and as a starting material in the preparation of crotyl cellulose which is a useful component of coating and molding compositions.

The following example further illustrates the present invention without limiting the scope thereof in any manner.

Example 1

This example illustrates a batchwise process for the preparation of 1-chloro-2-butene by reacting 1,3-butadiene with hydrogen chloride in a reaction medium containing controlled amounts of 3-chloro-1-butene.

Thirty-seven moles of hydrogen chloride were charged, with agitation, into a glass-lined autoclave which contained a mixture of glacial acetic acid and cuprous chloride consisting of 227 moles of acetic acid and 0.8 mole of cuprous chloride. To this mixture, there was then added 10.7 moles of 3-chloro-1-butene followed by an addition of 37 moles of 1,3-butadiene over a period of one hour. The mixture was maintained at a temperature of 60° centigrade and under a pressure of 60–70 p.s.i.g. for 6 additional hours. At the end of the 6 hours, heating was discontinued and 900 grams of water were then introduced into the autoclave with the result that there was formed an organic layer and an aqueous layer. The water layer was removed from the organic layer, which contained the 1-chloro-2-butene, by decantation and the organic layer was washed successively with 17 liter portions of: water, of a 5 percent by weight aqueous solution of sodium carbonate and again of water. The aqueous layer was removed after each addition of the washing liquid. The final organic layer was subjected to distillation with 90 grams of 3-chloro-1-butene being recovered as a distillate boiling at 64° C.–65° C. The 3-chloro-1-butene obtained in this manner had an index of refraction at 20° C. of 1.415.

2500 grams of 1-chloro-2-butene were recovered as a distillate boiling at a temperature of 83° C.–84° C. The 1-chloro-2-butene obtained in this manner had an index of refraction at 20° C. of 1.434. The weight ratio of 1-chloro-2-butene to 3-chloro-1-butene, exclusive of the 3-chloro-1-butene initially charged into the reaction medium was about 44:1. The yield of 1-chloro-2-butene was 69.5 percent.

As reported in Bull. Soc. Chem. Belg., volume 31 (1932), page 160, the boiling point of 3-chloro-1-butene is 64° C. and its index of refraction is 1.4149, and the boiling point of 1-chloro-2-butene is reported therein to be 84° C. and its index of refraction is 1.4350.

In order to further demonstrate that on reacting hydrogen chloride with 1,3-butadiene in accordance with this invention excellent yields of 1-chloro-2-butene are obtained without the substantial formation of 3-chloro-1-butene, Example 1 was repeated using the same procedure and using the same reactants in the same molar amounts with the exception that 3-chloro-1-butane was not present at the start of the reaction. The weight ratio of 1-chloro-2-butene to 3-chloro-1-butene was only 3:1. The yield of 1-chloro-2-butene was 48.5 percent. Both chlorobutenes were identified by boiling point and index of refraction values.

What is claimed is:
1. Process for the preparation of 1-chloro-2-butene which comprises admixing 1,3-butadiene with hydrogen chloride in contact with 3-chloro-1-butene wherein the said 3-chloro-1-butene is present in a mole ratio with respect to the 1,3-butadiene of from about 1.0:1 to about 1:5.
2. Process as defined in claim 1 wherein the mole ratio of 3-chloro-1-butene to 1,3-butadiene is from about 1:2 to about 1:4.
3. Process as defined in claim 1 wherein the mole ratio of 3-chloro-1-butene to 1,3-butadiene is from about 1:3 to about 1:4.
4. Process for the preparation of 1-chloro-2-butene which comprises admixing in an organic diluent and at a temperature in a range of from about 20° C. to about 100° C. hydrogen chloride, 1,3-butadiene and 3-chloro-1-butene wherein the mole ratio of 3-chloro-1-butene to 1,3-butadiene is from about 1:0.1 to about 1:5.
5. Process as defined in claim 4 wherein the mole ratio of 3-chloro-1-butene to 1,3-butadiene is from about 1:2 to about 1:4.
6. Process as defined in claim 4 wherein the mole ratio of 3-chloro-1-butene to 1,3-butadiene is from about 1:3 to about 1:4.
7. Process as defined in claim 4 wherein the process is conducted at a temperature in the range of about 45° C. to about 75° C.
8. Process as defined in claim 4 wherein the process is conducted at a temperature in the range of about 55° C. to about 65° C.
9. Process for the preparation of 1-chloro-2-butene which comprises admixing in a reaction medium containing an organic diluent, 1,3-butadiene, hydrogen chloride in an amount of about 0.5 mole to about 2 moles per mole of 1,3-butadiene, and 3-chloro-1-butene in an amount such that the mole ratio of 3-chloro-1-butene to 1,3-butadiene is from about 1:0.1 to about 1:5.
10. Process for the preparation of 1-chloro-2-butene which comprises heating at a temperature in the range of about 45° C. to about 75° C. a reaction mixture containing acetic acid, 1,3-butadiene, hydrogen chloride in an amount of about 0.5 mole to about 2 moles per mole of 1,3-butadiene, and 3-chloro-1-butene in an amount such that the mole ratio of 3-chloro-1-butene to 1,3-butadiene is from about 1:0.1 to about 1:5.
11. Process as defined in claim 10 wherein the mole ratio of 3-chloro-1-butene to 1,3-butadiene is from about 1:2 to about 1:4.
12. Process as defined in claim 10 wherein equimolar amounts of hydrogen chloride and 1,3-butadiene are employed.
13. Process as defined in claim 12 wherein the mole ratio of 3-chloro-1-butene to 1,3-butadiene is from about 1:2 to about 1:4.
14. Process for the preparation of 1-chloro-2-butene which comprises heating at a temperature of about 45° C. to about 75° C. a reaction medium containing 1,3-butadiene, hydrogen chloride in an amount of about 0.5 mole to about 2 moles per mole of 1,3-butadiene, a catalyst for promoting the reaction between said 1,3-butadiene and said hydrogen chloride, and 3-chloro-1-butene in amount such that the mole ratio of 3-chloro-1-butene to 1,3-butadiene is from about 1:2 to 1:5.

15. Process as defined in claim 14 wherein the catalyst is a salt of a metal below calcium in the electromotive series.

16. Process as defined in claim 14 wherein the process is conducted at a temperature in the range of about 55° C. to about 65° C.

17. Process for the preparation of 1-chloro-2-butene which comprises admixing 1,3-butadiene, hydrogen chloride in an amount of about 0.5 mole to about 2 moles per mole of 1,3-butadiene, acetic acid in an amount of about 2 moles to about 10 moles per mole of 1,3-butadiene, cuprous chloride in an amount of about 0.2 percent by weight to about 3 percent by weight based upon the weight of the acetic acid, and 3-chloro-1-butene in an amount such that the mole ratio of 3-chloro-1-butene to 1,3-butadiene is from about 1:0.1 to about 1:5.

18. Process for the preparation of 1-chloro-2-butene which comprises admixing at a temperature in the range of about 55° C. to about 65° C. 1,3-butadiene, hydrogen chloride in an amount of 1 mole per pole of 1,3-butadiene, acetic acid in an amount of about 5 moles per mole of 1,3-butadiene, cuprous chloride in an amount of about 0.5 percent by weight to about 1 percent by weight based on the weight of acetic acid, and 3-chloro-1-butene in an amount such that the mole ratio of 3-chloro-1-butene to 1,3-butadiene is from about 1:3 to about 1:4.

No references cited.